United States Patent
Tsai

(10) Patent No.: US 8,901,855 B2
(45) Date of Patent: Dec. 2, 2014

(54) LED LIGHT ILLUMINATING CONTROL SYSTEM AND METHOD

(71) Applicant: Hon Hai Precision Industry Co., Ltd., New Taipei (TW)

(72) Inventor: Kuo-Hsiung Tsai, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 16 days.

(21) Appl. No.: 13/922,928

(22) Filed: Jun. 20, 2013

(65) Prior Publication Data

US 2014/0117855 A1    May 1, 2014

(30) Foreign Application Priority Data

Oct. 26, 2012    (CN) .......................... 2012 1 04154546

(51) Int. Cl.
*H05B 37/02*    (2006.01)
*H05B 33/08*    (2006.01)

(52) U.S. Cl.
CPC ........ *H05B 33/0845* (2013.01); *H05B 37/0227* (2013.01); *Y02B 20/44* (2013.01); *Y02B 20/40* (2013.01)
USPC ............ 315/308; 315/291; 315/360; 340/541

(58) Field of Classification Search
USPC ................. 315/308, 309, 291, 294, 297, 360; 340/517, 541
See application file for complete search history.

(56) References Cited

U.S. PATENT DOCUMENTS

| | | | | |
|---|---|---|---|---|
| 6,459,919 B1 * | 10/2002 | Lys et al. | ...................... | 600/407 |
| 7,453,217 B2 * | 11/2008 | Lys et al. | ...................... | 315/291 |
| 8,138,690 B2 * | 3/2012 | Chemel et al. | ................ | 315/318 |
| 8,552,664 B2 * | 10/2013 | Chemel et al. | ................ | 315/308 |
| 8,610,377 B2 * | 12/2013 | Chemel et al. | ................ | 315/308 |
| 2012/0159290 A1 * | 6/2012 | Pulsipher et al. | ............. | 714/819 |
| 2013/0229396 A1 * | 9/2013 | Huebner | ....................... | 345/207 |
| 2013/0335574 A1 * | 12/2013 | Ishida et al. | .................. | 348/159 |

* cited by examiner

*Primary Examiner* — Thuy Vinh Tran
*Assistant Examiner* — Syed M Kaiser
(74) *Attorney, Agent, or Firm* — Novak Druce Connolly Bove + Quigg LLP

(57) ABSTRACT

The disclosure provides a LED light illuminating control system and a control method for illuminating LED ceiling lights, the system being applied in an electronic device. A detecting unit determines the entry of a person into the room, a capturing unit positioned on a ceiling of the room for captures image, and all the LED lights are illuminated, then all the LED lights other than those illuminating the location of the person are switched off. When the person moves to another part of the room, the LED light illuminating control system controls all the LED lights to illuminate, and after a set period switches off all the LED lights other than those illuminating the new location of the person, thus saving a lot of power.

15 Claims, 4 Drawing Sheets

LED LIGHT ILLUMINATING CONTROL SYSTEM AND METHOD

BACKGROUND

1. Technical Field

The disclosure relates to illuminating control technology and, more particularly, to a LED light illuminating control system and a control method for illuminating LED lights.

2. Description of Related Art

LED lights are popular. However, a user must trigger a switch to control all LED lights or a part of LED lights manually in order to control illumination, which is not inconvenient for the user.

Therefore, what is needed is a LED light illuminating control system to overcome the described shortcoming.

DETAILED DESCRIPTION

Figure 1:
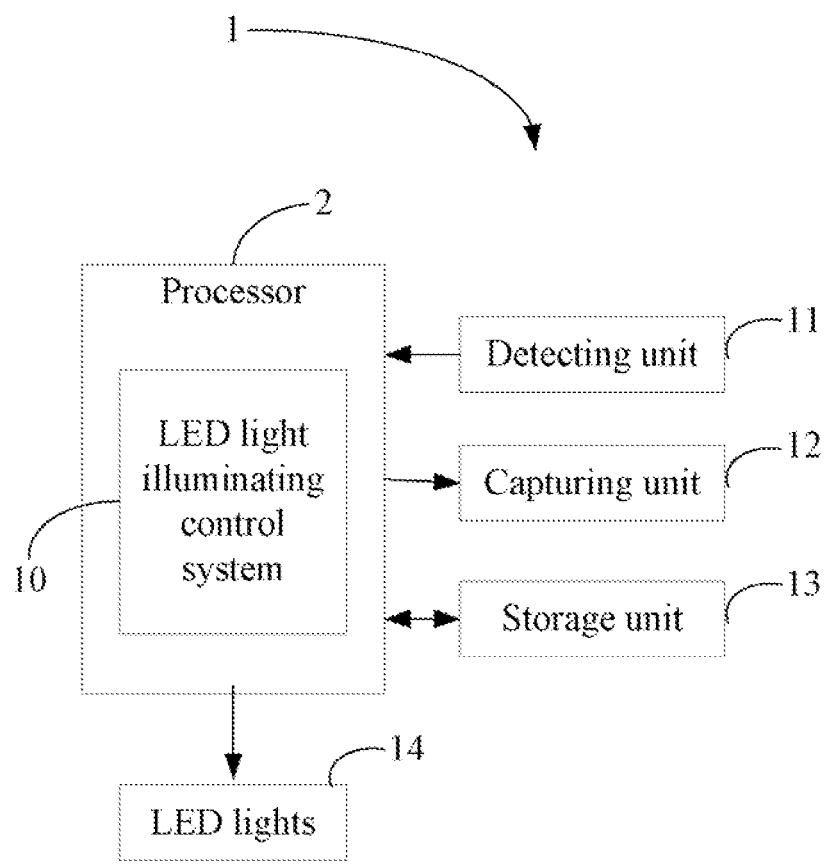
FIG. 1 is a block diagram of an electronic device applied to a LED light illuminating control system in accordance with an exemplary embodiment.
Figure 3:
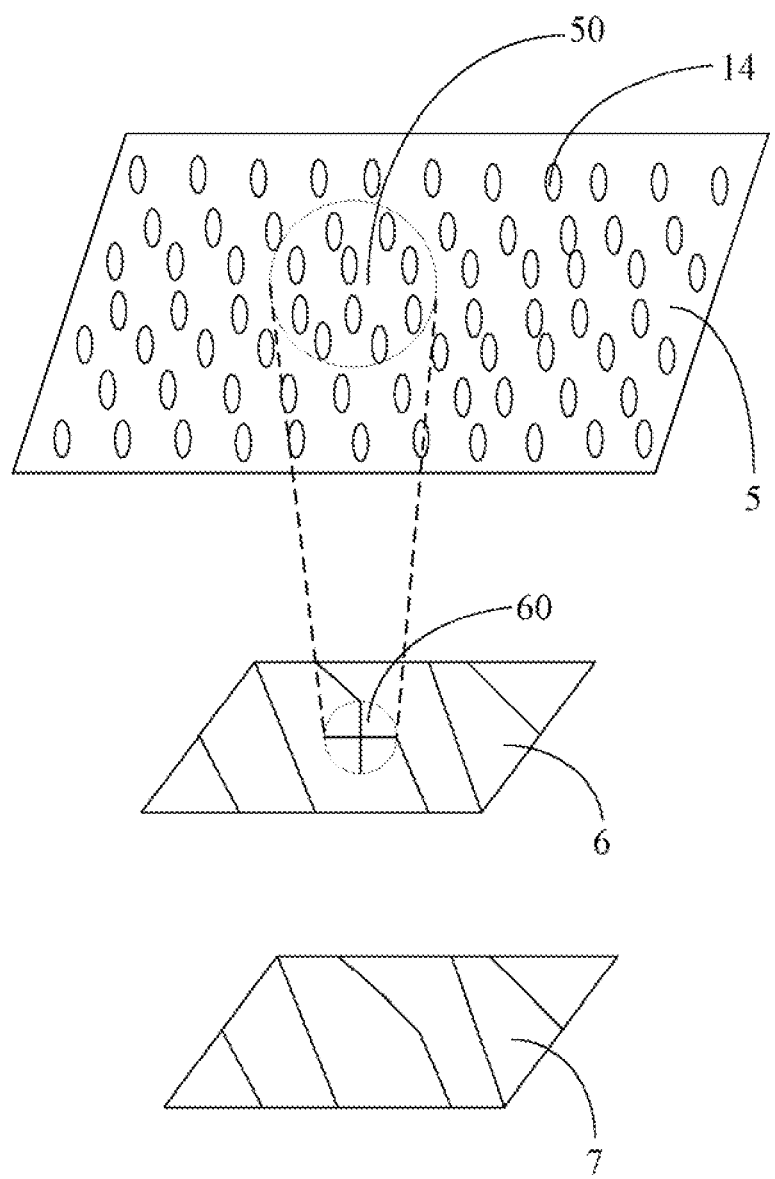
FIG. 3 is a schematic view of LED lights illuminated by the LED light illuminating control system of FIG. 1.
Figure 4:
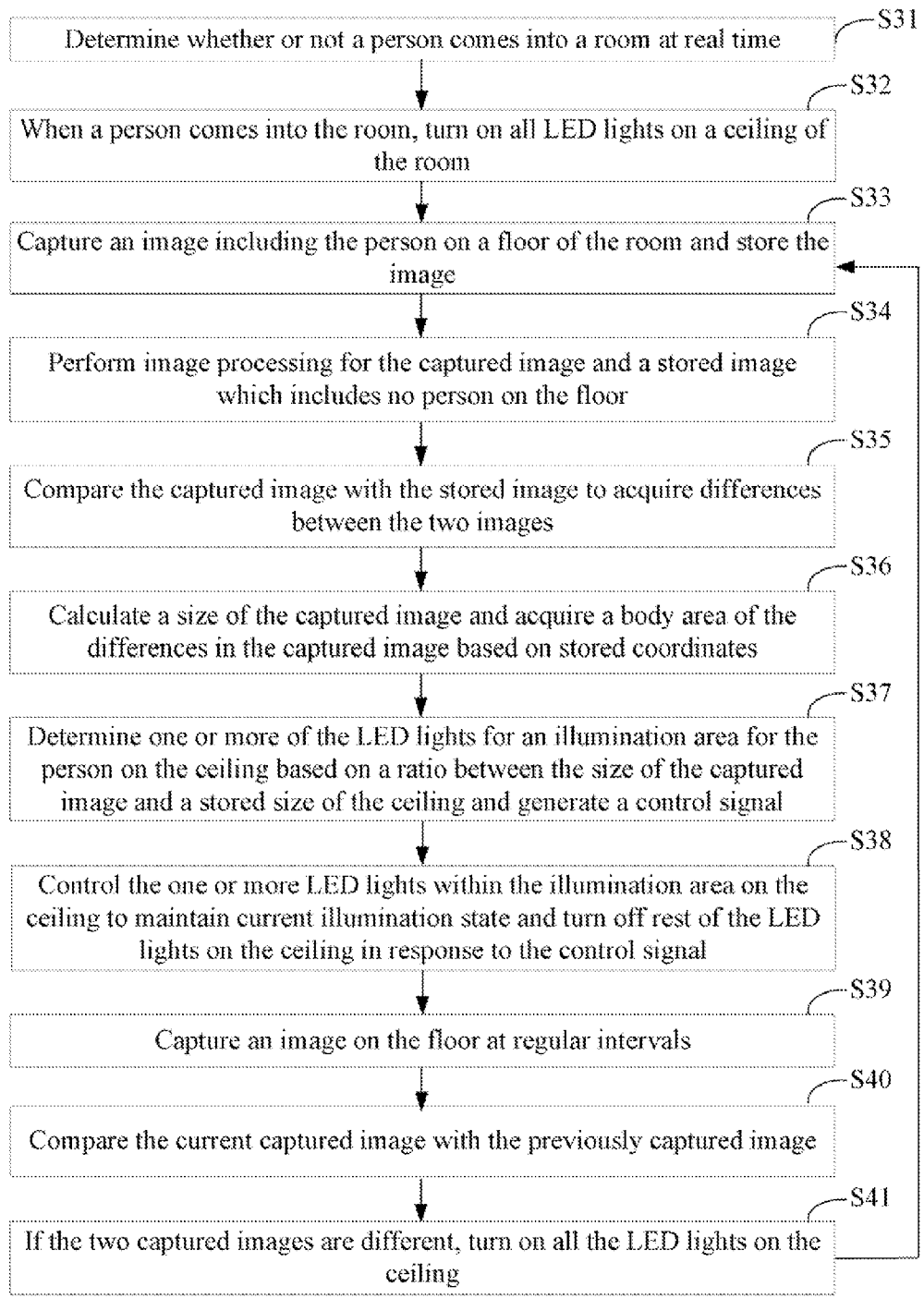
FIG. 4 is a flowchart illustrating a control method for illuminating LED lights in accordance with an exemplary embodiment.

FIG. 1 is a block diagram of an electronic device applied to a LED light illuminating control system in accordance with an exemplary embodiment The LED light illuminating control system 10 is applied in an electronic device 1. The electronic device 1 includes a processor 2 and a storage unit 13. The processor 2 controls the electronic device 1 to work and includes the LED light illuminating control system 10. The electronic device 1 is connected to a detecting unit 11, a capture unit 12, and a number of LED lights 14 which are positioned in a room, such as a classroom, an office, or a factory. In the embodiment, as shown in FIG. 3, all the LED lights 14 are on a ceiling 5 of the room. The detecting unit 11 detects an environment of the room at real time and determines whether or not the environment changes, it determines when a person comes into the room.

In the embodiment, the detecting unit 11 is a temperature sensor which senses a temperature of the room. When there is not any person in the room, the temperature of the room is stable and all the LED lights 14 are turned off. When a person comes into the room, the detecting unit 11 detects the greater body temperature of the person.

In another embodiment, the detecting unit 11 is a mechanical switch. The switch is near a door of the room. When the switch is triggered by a person, that means the person comes into the room, and all the LED lights 14 are turned on.

The capturing unit 12 is positioned in the middle of the ceiling 5 of the room and captures an image 6 of objects under the ceiling 5 of the room. In the embodiment, the capturing unit 12 is a wide-angle lens. All the LED lights 14 are aligned on the ceiling 5 of the room. For example, all the LED lights 14 are aligned in series or in parallel based on a size of the ceiling 5 or a distance between the ceiling 5 and a floor of the room.

The storage unit 13 stores the size of the ceiling 5, an image 7 which includes no person on the floor in a circumstance that all the LED lights 14 are turned on, and a predefined set of coordinates based on a size of the image.

Figure 2:
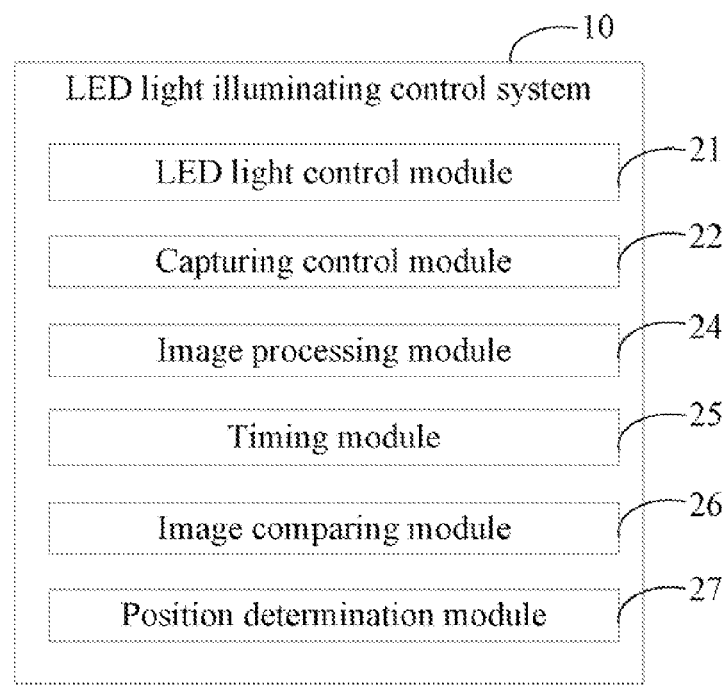
FIG. 2 is a block diagram of the LED light illuminating control system of FIG. 1.

As shown in FIG. 2, the LED light illuminating control system 10 includes a LED light control module 21, a capturing control module 22, an image processing module 24, a timing module 25, an image comparing module 26, and a position determination module 27.

When the detecting unit 11 detects that a person comes into the room, the LED light control module 21 turns on all the LED lights 14 on the ceiling 5. Therefore, the whole room is illuminated for the benefit of the person. The capturing control module 22 controls the capturing unit 12 to capture an image 6 including the person 60 on the floor of the room and stores the captured image 6 in the storage unit 13. The image processing module 24 performs image processing for the captured image 6 which includes the person on the floor and the stored image 7 which includes no person on the floor. The image comparing module 26 compares the captured image 6 with the stored image 7 to acquire differences 60 between the two images 6, 7. The differences 60 represent a body area where the person is positioned on the captured image 6. For example, the image processing module 24 performs a color processing for the two images based on a color algorithm and the image comparing module 26 compares the color of the two images to acquire the differences 60.

The position determination module 27 calculates a size of the captured image 6 and acquires the body area 60 of the differences in the captured image 6 based on the stored predefined set of coordinates. The position determination module 27 further determines one or more of the LED lights 14 for an illumination area 50 for the person on the ceiling 5 based on a ratio between the size of the captured image 6 and a stored size of the ceiling 5 and generates a control signal.

The LED light control module 21 controls the one or more LED lights within the illumination area 50 to maintain illumination for the person and turns off rest of the LED lights, in response to the control signal. If the person moves within the room, the timing module 25 starts to measure time in response to the control signal, and the capturing control module 22 controls the capturing unit 12 to capture an image on the floor at regular intervals. For example, the capturing control module 22 captures the image on the floor every two seconds.

The image comparing module 26 compares the current captured image with the previously captured image at the previously interval to identify similarities. If the similarities are less than a preset value, namely, the two captured images are significantly different, that means that the person under the illuminated LED lights has moved to a place in the room which is not illuminated, and the LED light control module 21 turns on all the LED lights on the ceiling, facilitating the activities of the person in any place in the room which was previously not illuminated, and then the LED light control module 21 controls the LED lights 14 corresponding to the new location of the person to maintain the illumination in the new location and turn off rest of the LED lights 14 on the ceiling.

Therefore, when the person moves to any position in the room, the LED light illuminating control system 10 controls LED lights 14 corresponding to that position to be turned on or maintained on and turns off rest of the LED lights 14 on the ceiling, thus saving power.

FIG. 3 is a flowchart illustrating a control method for illuminating LED lights in accordance with an exemplary embodiment.

In step S31, the detecting unit 11 detects the environment in the room.

In step S32, when the detecting unit 11 detects that a person comes into the room, the LED light control module 21 turns on all the LED lights 14 on the ceiling.

In step S33, the capturing control module 22 controls the capturing unit 12 to capture an image 6 including the person on the floor of the room and stores the captured image 6 in the storage unit 13.

In step S34, the image processing module 24 performs image processing for the captured image 6 which includes the person on the floor and the stored image 7 which includes no person on the floor.

In step S35, the image comparing module 26 compares the captured image 6 with the stored image 7 to acquire differences between the two images.

In step S36, the position determination module 27 calculates a size of the captured image 6 and acquires a body area 60 of the differences in the captured image 6 based on the stored predefined set of coordinates.

In step S37, the position determination module 27 further determines one or more of the LED lights for an illumination area 50 for the person as tracked from the ceiling based on a ratio between the size of the captured image and a stored size of the ceiling and generates a control signal.

In step S38, the LED light control module 21 controls the one or more LED lights 14 within the illumination area 50 on the ceiling 5 to maintain their current "on" state and turns off rest of the LED lights on the ceiling in response to the control signal.

In step S39, the timing module 25 starts to measure time, the capturing control module 22 captures an image on the floor at regular intervals.

In step S40, the image comparing module 26 compares the current captured image with the previously captured image.

In step S41, if the two captured images are different, the LED light control module 21 turns on all the LED lights on the ceiling, facilitating the activities of the person in any part of the room, and the procedure returns to step S34.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A LED light illuminating control system for an electronic device, wherein the electronic device is connected to a detecting unit positioned in a room for determining whether or not a person comes into the room, a capturing unit positioned on a ceiling of the room for capturing an image on a floor of the room, and a plurality of LED lights aligned on the ceiling, the electronic device comprises at least one processor to execute all modules of the LED light illuminating control system and a storage unit to store a size of the ceiling, an image which includes no person on the floor in a circumstance that all the LED lights are turned on, and predefined set of coordinates, the system comprising:
    a LED light control module to turn on all the LED lights when the detecting unit detects that a person comes into the room;
    a capturing control module to control the capturing unit to capture an image including the person on the floor and store the captured image;
    an image processing module to perform image processing for the captured image which includes the person on the floor and the stored image which includes no person on the floor;
    an image comparing module to compare the captured image with the stored image to acquire differences between the two images; and
    a position determination module to calculate a size of the captured image and acquire a body area of the differences in the captured image based on the stored predefined set of coordinates, determine to turn on or off one or more of the LED lights for an illumination area for the person on the ceiling based on a ratio between the size of the captured image and the size of the ceiling and generate a control signal, the LED light control module further to control the one or more LED lights within the illumination area on the ceiling to maintain current illumination state and turn off rest of the LED lights on the ceiling in response to the control signal.

2. The LED light illuminating control system of claim 1, wherein the detecting unit is a temperature sensor which senses a temperature of the room, when there is not any person in the room, the temperature of the room is stable and all the LED lights are turned off, and when the person comes into the room, the detecting unit detects the greater body temperature of the person.

3. The LED light illuminating control system of claim 1, wherein the detecting unit is a mechanical switch, the switch is near a door of the room, when the switch is triggered by the person and all the LED lights are turned on, it is determined that the person comes into the room.

4. The LED light illuminating control system of claim 1, wherein the image processing module is configured to perform a color processing for the two images based on a color algorithm and the image comparing module is configured to compare the color of the two images to acquire the differences.

5. The LED light illuminating control system of claim 1, further comprising:
    a timing module to start to measure time, the capturing control module further to control the capturing unit to capture an image on the floor at regular intervals; and
    the image comparing module to compare the current captured image with the previously captured image, and the LED light control module to turn on all the LED lights on the ceiling if the two captured images are different.

6. A control method for illuminating LED lights, the method comprising:
    detecting whether or not a person comes into a room;
    if the person comes into the room, turning on all LED lights on a ceiling of the room;
    capturing an image including the person on a floor of the room and storing the captured image;
    performing image processing for the captured image which includes the person on the floor and a stored image which includes no person on the floor;
    comparing the captured image with the stored image to acquire differences between the two images;
    calculating a size of the captured image and acquiring a body area of the differences in the captured image based on stored predefined set of coordinates;
    determining whether on or off one or more of the LED lights for an illumination area for the person on the ceiling based on a ratio between the size of the captured image and a stored size of the ceiling and generating a control signal; and
    controlling the one or more LED lights within the illumination area on the ceiling to maintain current illumination state and turning off rest of the LED lights on the ceiling in response to the control signal.

7. The control method for illuminating LED lights of claim 6, the step "detecting whether or not a person comes a room" comprising:

sensing a temperature of the room;

wherein when there is not any person in the room, the temperature of the room does not change and all the LED lights are turned off, and when the person comes into the room, detecting the greater body temperature of the person.

8. The control method for illuminating LED lights of claim 6, the step "detecting whether or not a person comes a room" comprising:

wherein a mechanical switch is near a door of the room, when the switch is triggered by the person and all the LED lights are turned on, it is determined that the person comes into the room.

9. The control method for illuminating LED lights of claim 6, further comprising:

performing a color processing for the two images based on a color algorithm and comparing the color of the two images to acquire the differences.

10. The control method for illuminating LED lights of claim 6, further comprising:

starting to measuring time;

capturing an image on the floor at regular intervals;

comparing the current captured image with the previously captured image; and if the two captured images are different, turning on all the LED lights on the ceiling.

11. An electronic device, wherein the electronic device is connected to a detecting unit positioned in a room for determining whether or not a person comes into the room, a capturing unit positioned on a ceiling of the room for capturing an image on a floor of the room, and a plurality of LED lights aligned on the ceiling; the electronic device comprising:

a storage unit to store a size of the ceiling, an image which includes no person on the floor in a circumstance that all the LED lights are turned on, and predefined set of coordinates; and a processor comprising:

a LED light control module to turn on all the LED lights when the detecting unit detects that a person comes into the room;

a capturing control module to control the capturing unit to capture an image including the person on the floor and store the captured image;

an image processing module to perform image processing for the captured image which includes the person on the floor and the stored image which includes no person on the floor;

an image comparing module to compare the captured image with the stored image to acquire differences between the two images; and a position determination module to calculate a size of the captured image and acquire a body area of the differences in the captured image based on the stored predefined set of coordinates, determine to turn on or off one or more of the LED lights for an illumination area for the person on the ceiling based on a ratio between the size of the captured image and the size of the ceiling and generate a control signal, the LED light control module further to control the one or more LED lights within the illumination area on the ceiling to maintain current illumination state and turn off rest of the LED lights on the ceiling in response to the control signal.

12. The electronic device of claim 11, wherein the detecting unit is a temperature sensor which senses a temperature of the room, when there is not any person in the room, the temperature of the room does not change and all the LED lights are turned off, and when the person comes into the room, the detecting unit detects the greater body temperature of the person.

13. The electronic device of claim 11, wherein the detecting unit is a mechanical switch, the switch is near a door of the room, when the switch is triggered by the person and all the LED lights are turned on, it is determined that the person comes into the room.

14. The electronic device of claim 11, wherein the image processing module is configured to perform a color processing for the two images based on a color algorithm and the image comparing module is configured to compare the color of the two images to acquire the differences.

15. The electronic device of claim 11, the processor further comprising:

a timing module to start to measure time, the capturing control module further to control the capturing unit to capture an image on the floor at regular intervals; and the image comparing module to compare the current captured image with the previously captured image, and the LED light control module to turn on all the LED lights on the ceiling if the two captured images are different.

* * * * *